United States Patent [19]

Worley

[11] Patent Number: 4,966,209

[45] Date of Patent: Oct. 30, 1990

[54] PRECISION MULTI-POINT LINEAR POSITIONING SYSTEM

[76] Inventor: Robert D. Worley, 2490 Fieldstone Dr., Conyers, Ga. 30208

[21] Appl. No.: 445,811

[22] Filed: Dec. 4, 1989

[51] Int. Cl.$^5$ ............................ B27C 5/02; B27B 1/00
[52] U.S. Cl. .................................. 144/134 A; 83/713; 83/723; 83/730; 144/2 R; 144/134 R; 144/3 B; 408/63; 409/70; 409/170; 409/219
[58] Field of Search ..................... 269/24; 144/2 R, 49, 144/134 R, 134 A, 136 R, 137, 356, 3 A, 3 B, 3 C; 408/63; 409/69, 70, 170, 219; 83/367, 713, 723, 726, 730

[56] References Cited

U.S. PATENT DOCUMENTS

| | | | |
|---|---|---|---|
| 2,613,703 | 10/1952 | Calvert | 83/723 |
| 3,353,429 | 11/1967 | Stuart et al. | 408/63 |
| 3,405,600 | 10/1968 | Ballared et al. | 409/170 |
| 4,037,502 | 7/1977 | Westfall | 83/726 |

Primary Examiner—W. Donald Bray
Attorney, Agent, or Firm—Needle & Rosenberg

[57] ABSTRACT

An apparatus for precision linear positioning of material along a frame, having carrier means for carrying the material juxtaposed above the frame, means for linearly moving the carrier means along the frame having a plurality of pneumatic cylinders each having an extendable and rectractable piston, the cylinders connected to each other in a series and including a first end pneumatic cylinder attached to the frame and a last end pneumatic cylinder attached to the carrier means, such that the carrier means is moved by the amount of the cumulative extension and retraction of the pistons, stopping means associated with each the pneumatic cylinder for limiting the extension of each the piston, and means for providing a controllable amount of air to each pneumatic cylinder to selectively control extension and retraction of each piston.

20 Claims, 5 Drawing Sheets

PRECISION MULTI-POINT LINEAR POSITIONING SYSTEM

BACKGROUND OF THE INVENTION

The present invention relates to a linear positioning system for positioning materials to be machined, and more specifically to a positioning system using pneumatic control devices.

With increasing labor costs in all areas of manufacturing, continuing development of machinery to replace skilled labor has been diligently pursued in most areas of manufacturing. Many examples are evident today of automated machines that replace hand-skilled labor and perform manufacturing functions in a more-precise, dependable, and cost-efficient manner. These machines have provided new standards of quality in the manufacture of materials and have made a wider variety of finished products available to the public due to the decreased cost of manufacture.

In many manufacturing applications, sheets or bulk forms of raw materials are automatically positioned about a material machining apparatus which subsequently acts upon the raw material in a way to produce a finished product. The automatic positioning of a raw product about a machining apparatus often allows for a reduction in the labor and time required to produce individual pieces in that the raw material is processed into a finished product while still in one large piece. As such, automatic material positioning systems have seen many applications in manufacturing processes that require machining or tooling of large pieces of material. Very accurate, and often very expensive, automatic material positioning systems have been produced, enabling the use of large volume manufacturing techniques for the production of precision products.

One area of manufacturing that has received comparatively little attention until the last few years, in terms of the application of automatic precision material positioners, is that of the woodworking art. As a consequence, aside from the development of various manually-operated tools, comparatively little effort has been expended to develop and perfect woodworking machinery which automatically performs woodworking functions. Further, as the need for more precise and well-finished wood products has increased, the need for machinery to automatically perform precision woodworking functions at lower costs of manufacture has also increased. Some representative examples of present automated woodworking machinery are found in U.S. Pat. Nos. 3,662,798, 3,734,153 and 4,112,986 which depict automated machinery utilized for performing cutting operations on sheets of wood.

Along with the above representative inventions relating to automatic woodworking machinery, there exists a variety of precision material positioning and machining systems capable of being adapted to the woodworking industry. These systems, however, tend to be very large and complicated in nature, and are frequently cost-prohibitive for a smaller manufacturing operations. Elaborate means are often employed to accomplish the desired precision of material finishing that is required over a large piece of woodworking material. These means frequently include massive material supporting tables made of cast iron or steel that are manufactured to very precise mechanical tolerances to insure that the desired machining accuracy is obtained over the length of the material. The positioning of the raw material about a machining apparatus is usually accomplished via complicated electromechanical, pneumatic, or hydraulic means requiring elaborate feedback mechanisms to insure precise material positioning. In many automated woodworking machines, multiple machining devices are precisely moved about a woodworking material, and the number of locations at which repetitive machine functions may be performed can be limited by the number of the machining devices As such, the present automated woodworking machinery is often limited by its large bulky size, complicated nature, high cost, and inherent inefficiency when used in small, less capital-intensive environments.

Therefore, there exists a need for a precision linear positioning system that is capable of precisely positioning raw woodworking material about a machining device.

There also exists a need for a precision linear positioning system that utilizes an efficient design of construction so that the linear positioning system need not be excessively massive or bulky in nature to achieve very precise positioning of the woodworking material throughout its entire length and width.

There exists a further need for a precision linear positioning system that is capable of being programmed over a range of functions and requires only simple operator adjustments or settings to facilitate changes in set-up and that can operate throughout an automated material machining process without operator intervention.

There exists a further need for a precision linear positioning system that is capable of being operated in a cost-efficient manner so that precisely-finished pieces of woodworking material may be manufactured rapidly and with little skilled labor involvement.

There exists still a further need for a precision linear positioning system that is relatively inexpensive and that can be efficiently utilized in smaller manufacturing operations or affordably dedicated to a single function in larger factories.

SUMMARY OF THE INVENTION

The present invention is directed to providing a precision linear positioning system for positioning materials to be machined. The positioning system utilizes pneumatic control devices to precisely position one large piece or several smaller pieces of woodworking material about a machining device. The positioning system utilizes a carrier apparatus for holding the woodworking material above, and for moving the material along, a specially-designed frame. The carrier is moved along the frame by means of a pneumatic set works apparatus which is attached both to the frame and the carrier. The system frame has mounted on it a machining apparatus, including a machining device which acts on the woodworking material The set works apparatus uses a number of pneumatic cylinders and pistons to linearly move the carrier along the system frame. The set works pneumatic cylinders and pistons precisely control the movement of the carrier on the frame and, thereby, provide a precision positioning of the woodworking material along the frame and about the machining apparatus. The machining apparatus also has provisions for positioning the machining device along the woodworking material by pneumatic means. The pneumatically-controlled system set works and machining apparatus is under the control of a controlling apparatus which includes a programmable controller and various electronic and pneumatic control devices. The system set works contains a number of mechanical adjustment devices which allow for the precision control of the movement of the set works apparatus. The system set works pneumatic cylinders and pistons are arranged in a unique configuration so as to allow mechanical set points for regulating the movement of the carrier on the system frame. In addition, electrical set points in the set works provide electrical inputs necessary for programmed operation.

The system frame is of a design configuration so as to allow the precision positioning of a large piece of woodworking material without a massive frame support means. The frame includes a central mainframe component which is constructed of very rigid tubular steel members that provide an extremely rigid and stable central frame supporting region. The stable central frame supporting region is the location at which the carrier is principally supported and its movement guided by the system frame. Extending out from the tubular mainframe are travel rails, upon which the carrier slides as it is moved about the machining apparatus. The travel rails are supported and adjusted by horizontal and vertical adjustment struts which connect to the central tubular mainframe section. In such a manner, the travel rails upon which the carrier slides are maintained in a fixed position without the need for a massive frame supporting structure. In addition, the central tubular mainframe section bears the majority of the weight of the carrier apparatus and material load. As the carrier's movement is primarily guided and directed by its attachment to the central tubular mainframe section, the precision positioning of the woodworking material on the carrier relative to the machining apparatus is assured. The movement of the woodworking material on the carrier is programmable for repeated positioning at multiple points along the length of the material.

The linear positioning system of the present invention has been designed to provide simple and precision positioning of a woodworking material about a machining apparatus. The linear positioning system is constructed of inexpensive materials and is designed for use by operators of low skill levels. The linear positioning system of the present invention thus provides a precision positioning system that is of low cost and is easily adaptable to small manufacturing settings It is, therefore, an object of the present invention to provide a precision linear positioning system that is capable of precisely positioning woodworking material along a frame and about a machining device.

It is also an object of the present invention to provide a precision linear positioning system that utilizes an efficient design of construction so that the linear positioning system need not be excessively massive or bulky in nature to maintain a precision positioning of the woodworking material throughout its entire length and width.

It is a further object of the present invention to provide a positioning system that is capable of being programmed over a range of functions and that requires only simple operator adjustments or settings to facilitate changes in set-up and that can operate throughout an automated material machining process without operator intervention.

It is another object of the present invention to provide a positioning system that is capable of being operated in a cost-efficient manner so that precisely-finished pieces of woodworking material may be manufactured rapidly and with little skilled labor involvement.

It is still further an object of the present invention to provide an efficient positioning system that can be made inexpensively enough to allow cost effective utilization in smaller manufacturing environments.

These and other objects and advantages are apparent from the following Detailed Description of The Preferred Embodiment.

BRIEF DESCRIPTION OF THE DRAWINGS

With the above as a background, reference should now be made to the following figures for a detailed description of the invention:

FIGS. 3a and 3b are a match line top-plan view of a section of the retracted linear positioning system set works;

FIG. 4 is a cross-sectional view along line 4—4 of FIG. 3a; and

DETAILED DESCRIPTION OF THE PREFERRED EMBODIMENT

Figure 1:
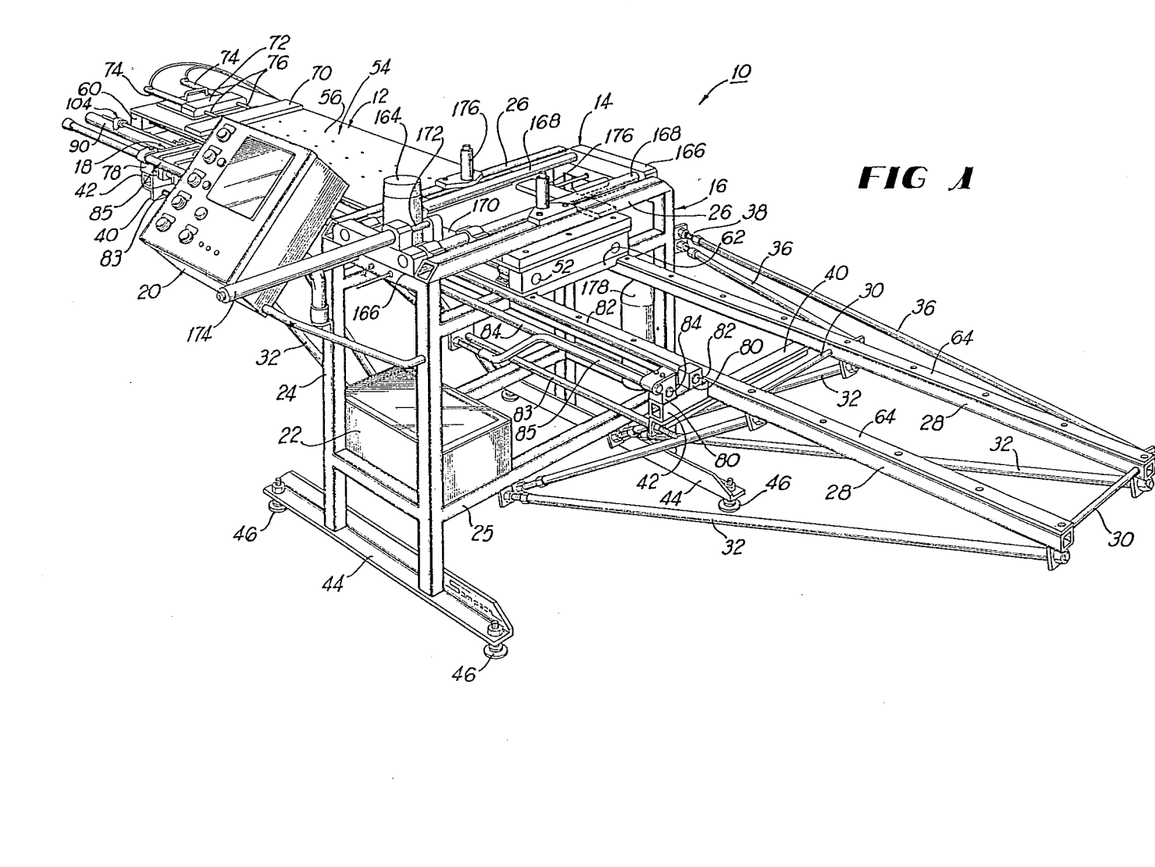
FIG. 1 is a perspective view of the precision linear positioning system of the present invention.

Turning now to the drawings in which like numerals represent like components throughout the several figures, the precision linear positioning system 10 of the present invention is shown generally in FIG. 1. The precision linear positioning system 10 comprises a carrier 12 which holds woodworking material for positioning under a machining apparatus 14. The machining apparatus 14 and carrier 12 rest upon a frame 16 which provides a support for the carrier 12. Woodworking material held by the carrier 12 above the frame 16 is linearly moved along the frame 16 under the control of the positioning system set works 18, which connect between the frame 16 and carrier 12. The set works 18, which utilizes pneumatic control devices, is controlled by a control apparatus which generally comprises an electronic control box 20 in communication with an air supply control box 22. The precision linear positioning system 10 of the present invention is capable of a variety of material positioning functions via a programmable controller contained in the electronic control box 20. In addition, a wide variety of configurations for the machining apparatus 14 are possible, giving the positioning system 10 flexibility as an automated woodworking machine.

Figure 2:
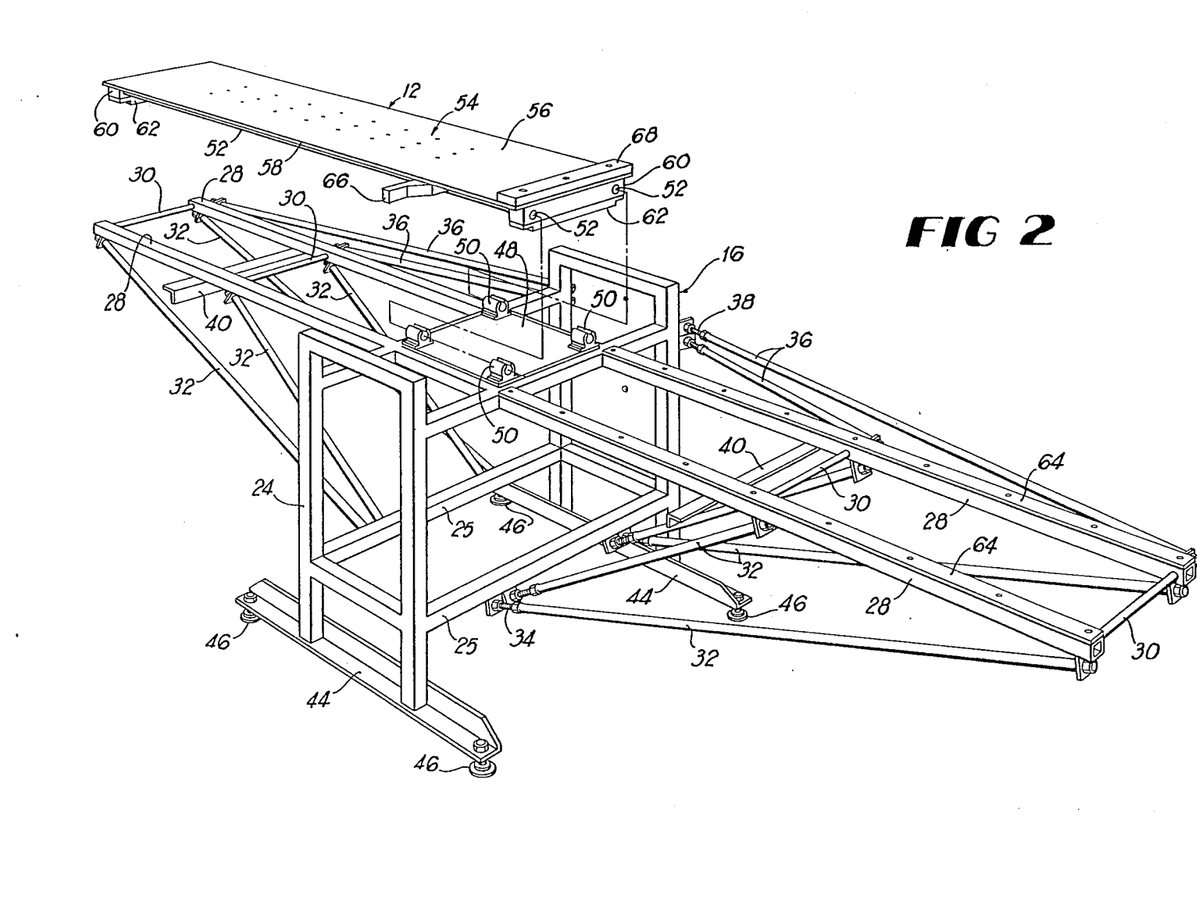
FIG. 2 is an exploded perspective view of the precision linear positioning system frame and carrier.

Referring to FIGS. 1 and 2, the frame 16 of the positioning system 10 is shown. FIG. 2 shows an exploded perspective view of the carrier 12 and frame 16 of the positioning system 10. The frame 16 comprises a central tubular mainframe 24 to which other frame components are attached. As the tubular mainframe 24 bears most of the weight of the elements of the positioning system 10, and also the weight of the woodworking material held by the carrier 12, the tubular mainframe 24 is of rigid, heavy-duty construction. The tubular mainframe 24 is configured in a box-like arrangement and has support members formed as extruded lengths of square tubing typically made of high density steel and are inter-connected by welded joints. In addition to being composed of strong support materials, the tubular mainframe 24 is constructed of materials held to precise mechanical tolerances, so as to provide a very rigid, yet precise, central supporting structure. The tubular mainframe 24 is shown in the exploded view of FIG. 2 without mainframe top members 26 for simplicity. The mainframe top members 26 are shown intact in FIG. 1, the complete perspective view of the positioning system 10.

The tubular mainframe 24 has extending from it two pairs of travel rails 28 which provide support for and guide the movement of the carrier 12. Each pair of travel rails 28 extend from an opposite side of the tubular mainframe 24. The two travel rails 28 that are located on the same side of the tubular mainframe 24 are positioned parallel to each other and directly opposite the corresponding travel rails 28 on the opposite side of the tubular mainframe 24. Each travel rail 28, directly attached to the tubular mainframe 24 at its end, must be relatively robust to prevent downward deflection of the rail 28 when supporting the carrier 12 having on it a woodworking material load. As such, each travel rail 28 should be formed as an extruded length of square tubing of substantial thickness much in the same way as the structural components of the tubular mainframe 24. Each pair of travel rails 28 have disposed between them adjustable rail positioning rods 30. Once properly adjusted, the rail positioning rods 30 are fixed in position between the travel rails 28.

In addition to their rigid connection to the tubular mainframe 24, the travel rails 28 are also supported by a plurality of travel rail angled vertical struts 32. The vertical struts 32, being rod-like in nature, are attached at one end to the tubular mainframe 24 and at an opposite end to the travel rails 28. For example, as shown in the preferred embodiment of FIG. 2, four such vertical struts 32 are on each opposite side of the tubular mainframe 24. Two of the four vertical struts 32 found on each side of the tubular mainframe 24 are attached at one end to the tubular mainframe 24 and at the other end to the unattached ends of the travel rails 28 found on the same side of the tubular mainframe 24. The unattached ends of the travel rails 28 are those ends which are furthest from the tubular mainframe 24. The second two of the four vertical struts 32 found on each side of the tubular mainframe 24 are attached at one end to the tubular mainframe 24 and at the other end to a location intermediate the length of the travel rails 28 found on the same side of the tubular mainframe 24. The vertical struts 32 are affixed to the bottom support member 25 of the tubular mainframe 24, and provide a means to prevent any downward deflection of the travel rails 28. The vertical struts 32 are made of a rigid, non-compressible material, such as tubular steel, and have an adjusting means 34 to provide a variable length of strut 32. The adjusting means 34 typically comprise a nut and bolt assembly. The adjusting means 34 allow the vertical struts 32 to precisely position and support the travel rails 28 in a vertical direction.

The frame 16 also comprises travel rail angled horizontal struts 36 which are attached to one of the travel rails 28 found on each side of the tubular mainframe 24. The horizontal struts 36 are attached at one end to the tubular mainframe 24 and at the opposite end to a travel rail 28. The horizontal struts 36 are attached to the rear support member 27 of the tubular mainframe 24. For example, as shown in the preferred embodiment of FIG. 2, two horizontal struts 36 may be found on each side of the tubular mainframe 24. One of the horizontal struts 36 is attached at a first end to the rear support member 27 of the tubular mainframe 24 and at its other end to the unattached end of the travel rail 28 closest to the rear support member 27. The second of the two horizontal struts 36 found on each side of the tubular mainframe 24 is attached at a first end to the rear support member 27 of the tubular mainframe 24 and at its other end to a location intermediate the length of the travel rail 28 closest to the rear support member 27. The travel rail horizontal struts 36 are made from a rigid, non-compressible material, such as tubular steel, and are preferably rod-like in shape. The horizontal struts 36 have adjusting means 38 for varying the length of the horizontal strut 36. The adjusting means 38 typically comprise a nut and bolt assembly. The horizontal struts are thereby able to support and precisely position the travel rail 28 closest to the rear support member 27 in a horizontal direction. Because of the rail positioning rods 30 disposed between each pair of travel rails 28, any horizontal adjustment of the travel rail 28 closest to the rear support member 27 by the horizontal struts 36 results in an adjustment of the other travel rail 28 of the pair. As a result of the adjustments of the horizontal struts 36 and vertical struts 32, the precise positioning and support of the travel rails 28 is achieved without bulky support means.

Securely mounted to the underside of each pair of travel rails 28 is a travel rail mounting member 40. The travel rail mounting member 40 typically comprises an "L" shaped steel bracket which is attached by bolting to the underside of each travel rail 28 pair. The travel rail mounting member 40 is utilized to attach the system set works 18 to the frame 16. Typically a spacing member 42, to which the system set works 18 attaches, is located on the travel rail mounting member 40.

The frame 16 is also stabilized in position relative to the ground by two stabilizing members 44 which are attached to the tubular mainframe 24. The stabilizing member 44 is typically a rigid, heavy-duty steel bracket which is securely attached to the supporting members of the tubular mainframe 24 by welding or other means. The stabilizing member 44 is chosen so as to be able to support the weight of the positioning system 10 and to provide a stable anchoring of the tubular mainframe 24 to the ground. Foot pads 46 are provided on the stabilizing member for the leveling of the stabilizing member 44 on uneven ground.

The tubular mainframe 24 has attached at its top section a carrier bearing platform 48 upon which four carrier bearings 50 rest. The carrier-bearing platform 48 is rigidly attached to the tubular mainframe 24 and provides a secure and stable surface for the mounting of the precision carrier bearings 50. The carrier bearings 50 are open configuration precision-linear bearings, preferably Thompson super ball bearings or their equivalent, which slidably engage the carrier travel rods 52 of the carrier 12. The carrier bearings 50 are aligned in pairs, such that each bearing 50 of a pair has its longitudinal axis coinciding with the longitudinal axis of the other bearing pair member. Each such pair of carrier bearings 50 then slidably engage a single carrier travel rod 52 for precisely guiding the movement of the carrier 12 along the frame 16.

The carrier 12, shown in FIGS. 1 and 2, is utilized to carry woodworking material above the frame 16. The carrier 12 securely holds and precisely positions woodworking material above the frame 16. The carrier 12 comprises a material platform 54 upon which the woodworking material may be placed. The material platform 54 is typically made of aluminum tool plate or other rigid material and has a finished material contacting surface 56.

Attached to the underside surface 58 of the material platform 54 are two endblocks 60. The endblocks 60 are located at opposite ends of the material platform 54 and have disposed between them a pair of carrier travel rods 52. The carrier travel rods 52 are precision steel rods that slidably engage the carrier bearings 50 of the frame 16. The carrier travel rods 52 are positioned so as to be parallel to the longitudinal axis of the material platform 54 and are securely fastened to, and provide support for, the platform 54. The rods 52 are attached to the platform 54 by "T"-shaped rails which are disposed between the rods 52 and the platform 54. The rods 52 are mounted to the "T"-shaped rails with machine screws and the "T"-shaped rails are then secured to the platform 54 via machine screws. The rods 52 are attached to, and terminate in, the endblocks 60. The travel rod 52 and carrier bearing 50 combination allows for the smooth movement of the carrier 12 on the frame 16. The endblocks 60 also have on their bottom surface friction-reducing means 62 which contact friction-reducing means 64 located atop the travel rails 28. The friction-reducing means 62 and 64 typically comprise UHMW plastic or a nylon polymer material which allows the endblocks 60 to smoothly slide on the travel rails 28 when the carrier 12 is moved along the travel rails 28. In this manner, some of the weight, and all of the leverage forces, of the loaded carrier 12 is taken off the carrier bearings 50 which serve as the primary supports for the carrier travel rods 52. The endblocks 60 thereby serve to disperse some of the weight of the loaded carrier 12 to the travel rails 28. This feature helps eliminate any massive carrier support means that might otherwise be necessary. The underside surface 58 of the material platform 54 also has attached to it a carrier attachment member 66 which provides a means for attaching the carrier 12 to the system set works 18.

The carrier material platform 54 has a means for securely holding woodworking material lengthwise in a fixed position while the positioning system 10 of the present invention is in operation. The holding means comprise a material clamp fixed element 68 and a material clamp movable element 70. The material clamp fixed element 68 is rigidly attached to the material contacting surface 56 of the material platform 54. The material clamp fixed element 68 provides a fixed surface against which one end of the woodworking material may be aligned. Near the opposite end of the material platform 54 is found the material clamp movable element 70 which is capable of moving along the material contacting surface 56. The material clamp movable element 70 is typically positioned parallel to the material clamp fixed element 68. Both the material clamp movable element 70 and material clamp fixed element 68 lie transverse to the longitudinal access of the material platform 54. The material clamp movable element 70 typically contacts another end of the piece of woodworking material resting on the carrier material platform 54 and forces the piece of woodworking material against the material clamp fixed element 68, thereby securing the woodworking material to the carrier 12.

The material clamp movable element 70 is attached to a pair of pneumatic pistons 76 which extend from a pair of pneumatic cylinders 74. The pneumatic cylinders 74 are attached to a movable material clamp securing apparatus 72 which rests on the carrier material contacting surface 56. The material clamp securing apparatus 72 may be permanently affixed at one position on the contacting surface 56, or may be adjustable in position on the surface 56. As shown in FIG. 2, the securing apparatus 72 is set in place on the surface 56 by aligning metal studs extending down from the apparatus 72 with matching holes in the surface 56. The stud and hole combinations allow the securing apparatus 72 to be held in place on the surface 56 at different locations if so desired. This feature allows the material clamp fixed element 68 and material clamp movable element 70 to accommodate a wide variety of woodworking material lengths. The extension and retraction of the pistons 76 within the cylinders 74 is automatically controlled by the electronic control box 20 so as to provide a means for contacting the material clamp movable element 70 against the end of the woodworking material placed on the material contacting surface 56. Extension of the pistons 76 forces the clamp movable element 70, and, therefore, the piece of woodworking material, against the material clamp fixed element 68. In this way, the material clamp securing apparatus 72 and clamp elements 68, 70 are used to securely clamp the woodworking material on the carrier 12 before any positioning or machining functions are performed on the woodworking material.

Figures 3A, 4:
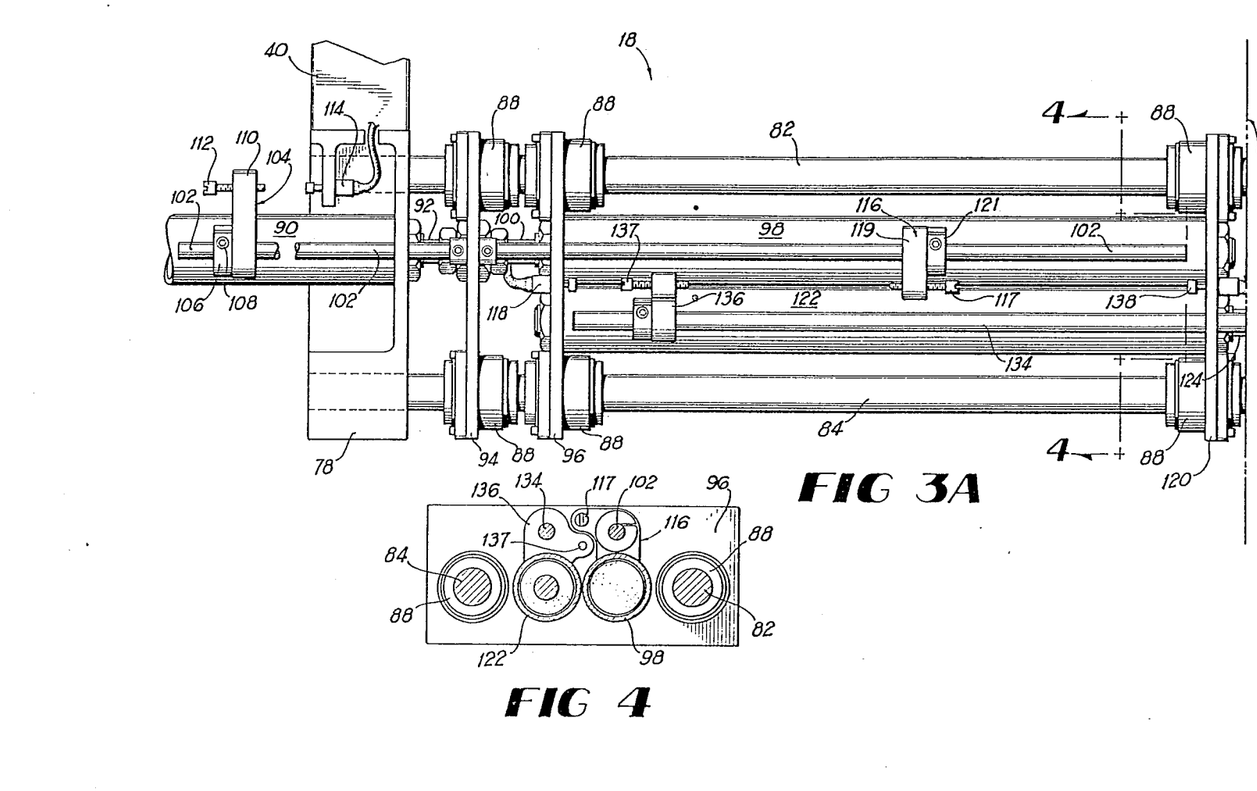
Figure 3B:
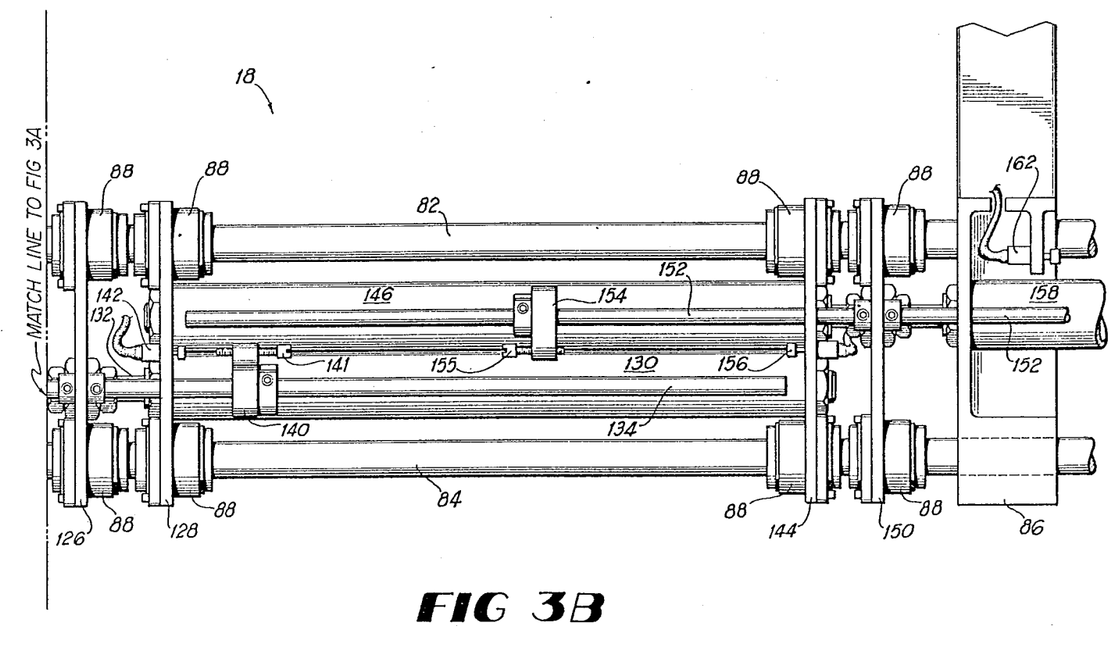

The system set works 18 of the present invention is shown in a retracted position in the top plan view shown in FIG. 3 and in a cross-sectional view in FIG. 4. The system set works 18 provides a means for linearly moving the carrier 12 along the frame 16. The system set works 18 has a guide rod end station 78 and a guide rod end support 80, the end support 80 shown only in FIG. 1 As shown in FIG. 1, the guide rod end station 78 and guide rod end support 80 secure the system set works 18 to the frame 16 at the spacing members 42 which are attached to the travel rail mounting members 40. A rear set work guide rod 82 and a front set work guide rod 84 are rigidly attached at one end to the guide rod end station 78 and at the other end to the guide rod end support 80. The guide rods 82, 84 are positioned so as to be parallel to one another and parallel to the longitudinal axis of the travel rails 28. Mounting member adjustment struts 83, shown in FIG. 1, are utilized to adjust deflections out of the guide rods 82, 84 relative to the travel rails 28. The struts are attached at one end to the mounting member 40 and at the other end to the mainframe 24. The struts 83 have an adjustable length so as to provide means for stressing the member 40, and therefore guide rods 82, 84, relative to the travel rails 28. Guide rod adjustment struts 85, shown in FIG. 1, are utilized to properly align the guide rods 82, 84 relative to the carrier attachment member 66.

The guide rods 82, 84 preferably are precision hardened steel rods which remain parallel to one another throughout their lengths. The guide rods 82, 84 also need to be of sufficient diameter so as to prevent any bending or warping of the rods with the operation of the system set works 18.

FIG. 3 shows a carrier positioning module 86 which is connected to the carrier attachment member 66. The carrier position module 86 slides along the guide rods 82, 84. Contained within the carrier positioning module 86 are a pair of bearings 88 which slidably engage the guide rods 82, 84. The bearings 88 are preferably precision linear bearings which provide for the smooth and precise movement of the carrier positioning module 86 along the guide rods 82, 84.

The set works 18 of this embodiment of the present invention comprises an arrangement of six pneumatic cylinders and pistons. Alternate designs are possible, however, using more or less pneumatic cylinders and pistons depending on the application.

Referring now to FIG. 3, the set works 18 is shown to have six pneumatic cylinders 90, 98, 122, 130, 146, 158 and six corresponding pistons 92, 100, 124, 132, 148, 160 operable therein. The cylinders utilized in the present invention are double-acting type pneumatic cylinders in that the pistons utilized in the present invention are capable of being controllably extended or retracted within the cylinders by way of pneumatic control. Each piston and corresponding cylinder is typically installed as a matched piston/cylinder unit. Piston/cylinder units utilized in the present invention are those such as manufactured by Bimba Manufacturing Co., Monee, Ill., Models 0912-D and 0917-DX, although other similar pistons and cylinders may be utilized. The term "piston," as used herein, refers to a piston and piston rod combination, the piston rod extending out from its associated cylinder and visible in the drawings. To extend a piston, a high pressure air supply is selectively routed into one end of its matching cylinder. A secondary air supply of reduced pressure is supplied to the opposite end of the cylinder and exerts a force opposite in direction to the extension movement of the piston. The secondary air supply acts to retract the piston back into the cylinder when the high pressure air supply is removed from the cylinder. In this manner, the pneumatic cylinders utilized in the present invention are said to be double-acting in that their matching pistons are capable of both extension and retraction.

The high pressure air supply is maintained at approximately 90 psi while the secondary air supply is maintained at approximately 35 psi. The routing of the high pressure air supply to the pneumatic cylinders 90, 98, 122, 130, 146, 158, along with the maintenance of a secondary air supply connected to the pneumatic cylinders 90, 98, 122, 130, 146, 158 is accomplished by means of pneumatic control lines which are not shown in the drawings. These pneumatic control lines interconnect the pneumatic cylinders 90, 98, 122, 130, 146, 158 with the air supply control box 22, shown in FIG. 1.

Shown in FIG. 3 is a first cylinder 90 attached at one end to the guide rod end station 78. The cylinder 90 has extending from it a first piston 92 which extends past the guide rod end station 78 in the direction of the carrier positioning module 86. Piston mounting plates 94, 126, 150 of the set works 18 comprise rigid structures that traverse the area between the rear set works guide rod 82 and front set works guide rod 84. The first piston mounting plate 94, and the other piston mounting plates 126, 150 of the set works 18, have contained within them a pair of bearings 88, preferably precision linear bearings, which slidably engage the guide rods 82, 84. The movement of the first piston mounting plate 94 is guided along the set works guide rods 82, 84 and proceeds in a smooth fashion due to the bearings 88. The first piston 92 is firmly attached to the first piston mounting plate 94 so that the extending movement of the first piston 92 is transmitted directly to the first piston mounting plate 94. In this manner, the extension and retraction of the first piston 92 moves the first piston mounting plate 94 back and forth along the set works guide rods 82, 84. Similarly, the third and fifth pistons 124, 148 are firmly attached to the second and third piston mounting plates 126, 150, respectively. The extension and retraction of the third and fifth pistons 124, 148 thus moves the second and third piston mounting plates 126, 150, respectively, back and forth along the set works guide rods 82, 84.

Adjacent to the first piston mounting plate 94 on the set works guide rods 82, 84 is the first cylinder mounting plate 96. Adjacent to the second piston mounting plate 126 are the second and third cylinder mounting plates 120, 128. A fourth cylinder mounting plate 144 is adjacent to the third piston mounting plate 150. The cylinder mounting plates 96, 120, 128, 144 of the set works 18 comprise rigid structures that traverse the area between the rear set works guide rod 82 and front set works guide rod 84 and can have contained within them a pair of bearings 88 which slidably engage the guide rods 82, 84, as described previously for plates 94, 126, 150.

Attached to the first cylinder mounting plate 96 is a second cylinder 98 having a second piston 100 therein. The second cylinder 98 is mounted to the mounting plate 96 in such a way that its extending piston 100 is attached to the first piston mounting plate 94. In this manner, the first piston 92 and second piston 100 oppose one another. When in the retracted position, as shown in FIG. 3, the second piston 100 cannot be further retracted into the second cylinder 98 and, therefore, any sliding movement of the first piston mounting plate 94 is transmitted to the cylinder mounting plate 96. Therefore, when the first piston 92 is extended from the first cylinder 90, the first piston mounting plate 94 and cylinder mounting plate 96 will be moved in the direction away from the end station 78. Further, if the second piston 100 is extended from the second cylinder 98, it, too, will also move the cylinder mounting plate 96 away from the end station 78. As will be seen more clearly in the discussion below with respect to FIG. 5, the movement of plate 96 will be translated into the movement of the carrier positioning module 86 and, therefore, the carrier 12.

The first piston mounting plate 94 has attached to it a first position set control rod 102. The set control rod 102 extends in one direction through an opening in the guide rod end station 78 and in another direction through an opening in the first cylinder mounting plate 96. The set control rod 102 is firmly attached to the first piston mounting plate 94 and moves in unison with it. When the first piston 92 is extended from the first cylinder 90, thereby moving the first piston mounting plate 94 away from the end station 78, the first position set control rod 102 is moved through the opening in the guide rod end station 78. In a similar manner, when the second piston 100 is extended from the second cylinder 98 and the first cylinder mounting plate 96 is thereby moved away from the first piston mounting plate 94, the first position set control rod 102 is moved through the opening of the first cylinder mounting plate 96.

Attached to the first position set control rod 102, on the opposite side of station 78 from plate 94, is a first position set control apparatus 104. The first position set control apparatus 104 comprises a set control clamp collar 106 having therein a set control clamp collar adjustment screw 108. The set control collar 106 surrounds the first position set control rod 102 and is a "pinch-type" collar in that its position on the set control rod 102 may be secured by means of adjusting the adjustment screw 108 until the collar is "pinched" on the rod 102. Firmly attached to the set control clamp collar 106 is a set control switch trip mount 110 which also surrounds the rod 102. The set control switch trip mount 110 has located within it a set control stop pin 112 whose position relative to the set control switch trip mount 110 may be adjusted. The set control stop pin 112 is typically a standard machine set screw.

Mounted on the guide rod end station 78 generally opposed from set control apparatus 104 is a first limit switch 114 which is used to provide an electrical signal back to the electronic control box 20. The first limit switch 114 is a precision electromechanical switch having a repeatable tripping action. In this manner, the limit switch 114 may be used to provide an electrical signal when set control stop pin 112 contacts the switch. The stop pin 112 and limit switch 114 are aligned so that the stop pin 112 may contact the limit switch 114 when the first position set control apparatus 104 is moved near the limit switch 114. The limit switch 114 is normally activated as a result of the first piston 92 being extended from the first cylinder 90 which moves the first piston mounting plate 94, thereby moving the first position set control rod 102 through the opening in the guide rod end station 78 and pulling the first position set control apparatus 104 stop pin 112 toward the first limit switch 114. When the set control stop pin 112 contacts limit switch 114, an electrical signal is provided back to the electronic control box 20 indicating that the first position set control apparatus 104 has reached a desired position relative to the end station 78. Normally, the electrical signal is sent when the apparatus 104 contacts the station 78.

The first position set control apparatus 104 is also utilized as a mechanical stop for the extension of the first piston 92 from the first cylinder 90. Upon receiving the proper pneumatic control signal, the first piston 92 will be extended from the first cylinder 90 until the first position set control apparatus 104 is pulled against the guide rod end station 78, thereby limiting the extension of the piston 92. In this manner, control rod 102 and set control apparatus 104 act as a stopping means for limiting the extension of the first piston 92. The extension of the first piston 92 from the first cylinder 90 is also, of course, limited by the absolute maximum length of the first piston 92. Normally, as the apparatus 104 contacts the station 78, an electrical signal is provided by switch 114 to box 20, indicating that the piston 92 is extended in place and another operation in the set works 18 may now take place.

Attached to the end of the control rod 102 on the opposite side of plate 96 from plate 94 is a second position set control apparatus 116 which comprises similar elements as the first position set control apparatus 104. As in the first position set control apparatus 104, the second position set control apparatus 116 has a set control clamp collar 121 which is affixed to the set control rod 102 and a set control stop pin 117 which is adjustably mounted in a set control switch trip mount 119 attached to the clamp collar 121. The stop pin 117 of the second position set control apparatus 116 opposes a limit switch, namely the second limit switch 118, which is located on the first cylinder mounting plate 96. When the second piston 100 is extended from the second cylinder 98, a portion of the position set control rod 102 is pulled through the opening in the first cylinder mounting plate 96. As in the movement of the first position set control apparatus 104, the second position control apparatus 116 is ultimately brought in contact with the limit switch 118 when the second piston 100 is extended to a desired position. In the above-described matter, it can be seen that the first position set control rod 102 and set control apparatus 104, 116, are utilized to set the predetermined extensions of their associated pistons and act as a stopping means for limiting the extensions of their associated pistons.

The remaining sections of the set works 18 are configured in a similar manner. The set works is arranged so that pistons 92, 124, 148 oppose pistons 100, 132, 160, respectively. Pistons 92 and 100 are joined at plate 94, while pistons 124 and 132 are joined at plate 126. The remaining pistons 148, 160 are joined at plate 150.

Thus, a second cylinder mounting plate 120 is mounted to the end of the second cylinder 98 at the cylinder end which does not have the second piston 100 extending from it. Also mounted between the first cylinder mounting plate 96 and the second cylinder mounting plate 120 is a third cylinder 122 containing a third piston 124, such that the piston 124 extends through the second cylinder mounting plate 120. The third piston 124 is attached to a second piston mounting plate 126. As such, the extension or retraction of the third piston 124 causes the back and forth movement of the second piston mounting plate 126 along the guide rods 82, 84.

Adjacent to the second piston mounting plate 126 and closer to the carrier positioning module 86 is a third cylinder mounting plate 128. The third cylinder mounting plate 128 has attached to it a fourth cylinder 130 having a fourth piston 132 therein. The fourth piston 132 is attached to the second piston mounting plate 126 and opposes the third piston 124.

A second position set control rod 134 is attached to the second piston mounting plate 126 and extends through openings in both the second cylinder mounting plate 120 and the third cylinder mounting plate 128. The movement of the third cylinder mounting plate 128 relative to the second piston mounting plate 126 is controlled by the action of the fourth piston 132. A third position set control apparatus 136 is attached to the portion of the second position set control rod 134 overlying the third cylinder 122. The third position set control apparatus 136 has a set control stop pin 137 for contacting a third limit switch 138 found attached to the second cylinder mounting plate 120.

As the third piston 124 is extended from the third cylinder 122, the third position set control apparatus 136, being affixed to the second position set control rod 134, is pulled toward the second cylinder mounting plate 120 containing the third limit switch 138. The contacting of the third position set control apparatus 136 with the second cylinder mounting plate 120 provides a mechanical stop for the extension of the third piston 124. As the apparatus 136 contacts the plate 120, the switch 138, being contacted by the pin 137, provides a signal to the electronic control box 20.

Mounted to the section of the second position set control rod 134 that overlies the fourth cylinder 130 is a fourth position set control apparatus 140 which has a set control stop pin 141 for contacting a fourth limit switch 142 found attached to the third cylinder mounting plate 128. As the fourth piston 132 is extended from the fourth cylinder 84, the apparatus 140, being affixed to the rod 134, is pulled toward the third cylinder mounting plate 128 containing the fourth limit switch 142. The contacting of the fourth position set control apparatus 140 with the plate 128 provides a mechanical stop for the extension of the fourth piston 132. As the apparatus 140 contacts the plate 128, the switch 142, being contacted by the pin 141, provides a signal to the electronic control box 20.

Located further down the guide rods 82, 84, and closer to the carrier positioning module 86, is a fourth cylinder mounting plate 144 which has attached to it the end of the fourth cylinder 130 that does not have the fourth piston 132 extending from it. The fourth cylinder mounting plate 144 has attached to it a fifth cylinder 146 having a fifth piston 148 therein. The fifth piston 148 is attached to a third piston mounting plate 150 which lies adjacent to the carrier positioning module 86. The fifth cylinder 146 is attached at its end opposite the end which has the fifth piston 148 extending from it to the third cylinder mounting plate 128.

Next to the third piston mounting plate 150 is found the carrier positioning module 86 which forms the point of attachment of the set works 18 to the carrier attachment member 66. The carrier positioning module 86, along with the fourth cylinder mounting plate 144, has contained within it openings through which a third position set control rod 152 passes. The third position set control rod 152 is attached to the third piston mounting plate 150. Attached to the section of the third position set control rod 152 that overlies the fifth cylinder 146 is a fifth position set control apparatus 154. The fifth position set control apparatus 154 has a control stop pin 155 which contacts the fifth limit switch 156 which is attached to the fourth cylinder mounting plate 144. The fifth piston 148 of the fifth cylinder 146 moves the third piston mounting plate 150 back and forth along the guide rods 82, 84 relative to the fourth cylinder mounting plate 144 when the fifth piston 148 extends and retracts. The fifth position set control apparatus 154 is thereby brought to contact the fifth limit switch 156 and fourth cylinder mounting plate 144 when the fifth piston 148 is extended. In this way, the extension of the fifth piston 148 is mechanically limited by the contacting of the apparatus 154 with the plate 144. As the apparatus 154 contacts the plate, the switch 156, being contacted by the pin 157, provides a signal to the electronic control box 20.

A sixth cylinder 158 is attached to the carrier positioning module 86 and has extending from it a sixth piston 160. The sixth piston 160 is attached to the third piston mounting plate 150 and causes the carrier positioning module to move away from the third piston mounting plate 150 when extended. The section of the third position set control rod 152 which overlies the sixth cylinder 158 has attached to it a sixth position set control apparatus which is not shown in FIG. 3. This sixth position set control apparatus contains a stop pin for contacting the sixth limit switch 162 found attached to the carrier positioning module 86. The sixth position set control apparatus contacts the module 86 when the sixth piston 160 is extended to its desired dimension and, therefore, provides a mechanical stop. The limit switch 162 provides a signal to the control box 20 when the control apparatus contacts the module 86.

FIG. 4 shows a cross-sectional view of the set works 18 through line 4—4 of FIG. 3. The position set control rods 134, 102 overlay the third and second cylinders 122, 98, respectively. The dimensions of the third position set control apparatus 136 and the dimensions of the second position control apparatus 116 are such that the position control apparatus may pass each other upon sliding along the set works 18. Also shown on the cross-sectional view of FIG. 4 are guide rods 82, 84 and the first cylinder mounting plate 96. The first cylinder mounting plate 96 has imbedded in it bearings 88 as shown, which slidably engage the guide rods 82, 84.

An example of a machining apparatus 14 is shown in FIG. 1. The machining apparatus 14, which acts as a machine means, is mounted on the tubular mainframe 24 of the frame 16. The machining apparatus 14 of the present invention may comprise a variety of elements, depending on the particular woodworking manufacturing process for which the linear positioning system 10 is used. Also, multiple machining apparatus 14 acting simultaneously or sequentially may also be utilized. In a typical system configuration, the machining apparatus 14 contains a machining device 164 which acts upon woodworking material moved under the machining apparatus 14 by the carrier 12. The machining device 164 can be any number of a wide variety of woodworking tools, such as a drill or router. The machining apparatus 14, as shown in FIG. 1, comprises a pair of guide rod holding blocks 166 mounted to the tubular mainframe 24. Disposed between the guide rod holding blocks 166 are a pair of guide rods 168. The guide rods 168 are securely fastened to the guide rod holding blocks 166 and are positioned parallel to one another. The guide rods 168 are made of a rigid material, and are preferably precision steel guide rods. Sliding along the length of the guide rods 168 of the machining apparatus 14 is a machining device mounting assembly 170. The machine device mounting assembly 170 has attached to it the machine device 164. The machine device mounting assembly 170 slidably engages the guide rods 168 so that the movement of the machine device mounting assembly 170 occurs in a smooth fashion along the guide rods 168. Attached to the machine device mounting assembly 170 is a machine device positioning piston 172. The machine device positioning piston 172 is contained within a machine device positioning cylinder 174 which is a pneumatically controlled cylinder capable of extending and retracting the machine device positioning piston 172. The machine device positioning cylinder 174 is firmly attached to the guide rod holding block 166. In this manner, the sliding of the machine device mounting assembly 170 along the guide rods 168 may be controlled by the extension and retraction of the machine device position piston 172.

Mounted to the mainframe top members 26 are accessory cylinder and piston assemblies 176. The accessory cylinder and piston assemblies 176 may be utilized for performing accessory operations on the piece of woodworking material positioned under the machine apparatus 14. For example, the accessory cylinder and piston assembly 176 may be used to actuate a clamp which may be forced down upon the piece of woodworking material to provide extra stability to the woodworking material when it is properly positioned under the machining apparatus 14 and is being acted upon by the machine device 164. The machine device 164, machine device positioning cylinder 174, and accessory cylinder and piston assemblies 176 are all under electronic or pneumatic control, as are the other operative elements of the linear positioning system 10.

The operation and control of the precision linear positioning system 10 is directed by the electronic control box 20. The electronic control box 20 contains the necessary electronic hardware to provide both manual and automatic control of the positioning system 10. The electronic control box 20 comprises manual control switches and status indicator lights on its front panel for operating and monitoring the various system 10 functions. The control box 20 also contains an electronic programmable controller which directs the sequencing and operation of the cylinders and pistons of the set works 18 and machining apparatus 14. The programmable controller is of the type that may be programmed to provide a variety of system functions and operations in sequence, and is easily interfaced with the operative devices of the positioning system 10. The programmable controller used in the present invention is one like that manufactured by SMC Pneumatics Inc., Indianapolis, Ind., Model No. ECC 50. Other programmable controllers having similar programming capabilities may also be utilized.

The electronic control box 20 is wired to and communicates with the air supply control box 22. The air supply control box 22 contains pneumatic control valves such as those manufactured by SMC Pneumatics Inc., Indianapolis, Ind., Model No. NZ 4124. Other control valves having similar function may be used. The air supply control box 22 has emerging from it (not shown in FIG. 1), a number of pneumatic cylinder control lines which control the operation of the pneumatic cylinders and pistons of the positioning system 10. Each pneumatic cylinder found within the system set works 18 has connected to it a high pressure air supply control line and a secondary air supply control line. The high pressure air supply control line routes a high pressure air supply of approximately of 90-100 psi, preferably 90 psi, to the pneumatic cylinders to extend the pneumatic pistons therein. The secondary air supply control lines maintain a constant secondary air supply pressure, or back pressure, on the pneumatic cylinders of approximately 30-40 psi, preferably 35 psi. The secondary air supply pressure is utilized to provide a constant biasing force to the extended pistons, and allows for the retraction of the pistons when the high pressure air supply is removed from the cylinders and the cylinders are allowed to exhaust. Also shown in FIG. 1, is a cylinder exhaust surge tank 178 connected to the secondary air supply of the positioning system 10. A system air supply source, which is not shown in the figures, supplies both the high pressure air supply of approximately 90-100 psi and the secondary air supply of approximately 30-40 psi. The air supply source is connected to the air supply control box 22 and typically comprises compressed air from a commercial air compressor unit. The compressed air is filtered at 5 micron, mist lubricated, and then pressure regulated by 2 separately controllable regulators for the high pressure air supply at 90-100 psi and the secondary air supply at 30-40 psi. The electronic control box 20, air supply control box 22, switches 114, 118, 138, 142, 156, 162, the compressed air supply, and the air supply control lines together comprise a means for providing a controllable amount of air to each pneumatic cylinder to selectively control extension and retraction of the pistons of the set works 18.

The speed of movement of the pistons 92, 100, 124, 132, 148, 160 within the cylinders 90, 98, 122, 130, 146, 158 is controlled by adjustable exhaust flow control valves mounted on the cylinders. The extension force of each piston is equal to the net difference between the high pressure air supply force applied to the piston and the secondary air supply force applied to the same piston. Also, the use of exhaust flow controls in both piston directions dramatically reduces normally encountered pneumatic system actuation shocks. This virtually shock free operation can be expected to result in long component life and assure continued alignment of critical moving parts.

The operation of the precision linear positioning system 10 is based upon the control and movement of the system set works 18. As previously described, the system set works 18 connects between the frame 16 and carrier 12. In this way, the movement of the carrier 12 along the frame 16 is controlled by the set works 18. The set works 18 is attached to the carrier 12 at the carrier attachment member 66, which is securely fastened to the carrier positioning module 86 of the set works 18. Therefore, the movement of the carrier positioning module 86 along the set works guide rods 82, 84 controls the movement of the carrier 12 along the travel rails 28 of the frame 16. The guide rod end station 78 of the set works 18 is securely attached to the travel rail mounting member 40 so as to provide a point of attachment for the system set works 18 to the frame 16. The system set works 18 is shown in the fully retracted position in FIG. 3. The fully retracted position is attained when the high pressure air supply is disconnected from the cylinders and the pistons are in their retracted positions. The pistons are maintained in their retracted positions by the constant secondary air supply which is connected to all of the pneumatic cylinders of the set works 18.

The extension of the pistons of the set works 18 is pneumatically controlled via the air supply control box 22 through which the high pressure air supply is selectively routed to the desired pistons. The air supply control box 22 is controlled by the electronic control box 20 which contains the electronic programmable cylinder controller previously discussed. The programmable cylinder controller found in the electronic control box 20 is programmed so as to select the appropriate extension and retraction of select pistons of the set works 18. In addition, the electronic control box 20 receives electrical signals from the limit switches 114, 118, 138, 142, 156, 162 of the set works 18 which indicate desired extended positions of the pistons. The electronic control box 20 also contains provisions for manual activation of pneumatic control valves which extend and retract the pistons of the set works 18.

The extension of the first piston 92 of the first cylinder 90 is initiated by the routing of the high pressure air supply to the first cylinder 90. The extension of the first piston 92 causes the movement of the first piston plate 94 down the set works guide rods 82 in the direction of the carrier positioning module 86. As the first piston mounting plate 94 moves down the guide rods 82, 84, the section of the first position set control rod 102 overlying the first cylinder 90 is moved through the opening in the guide rod end station 78. As previously described, the first position set control rod 102 has adjustably attached to it a first position set control apparatus 104. The first position set control apparatus 104 has contained therein a set control stop pin 112. The first piston 92 is extended from the first cylinder 90 until the first position set control apparatus 104 contacts the guide rod end station 78. At the time that the apparatus 104 contacts the end station 78, the set control stop pin 112 of the first position set control apparatus 104 contacts the first limit switch 114 and an electrical signal is provided to the electronic control box 20. The moving of the first position set control apparatus 104 against the guide rod end station 78 provides a mechanical stop for the extension of the first piston 92. The force of movement of the first piston 92 in extending from the first cylinder 90 is such that the mechanical stop provided by the first piston set control apparatus 104 is sufficient to halt the extension of the first piston 92 at a desired position. The electrical signal provided by the limit switch 114 when contacted by the control apparatus 104 is typically a step condition requirement for the automated program sequence in that the next step of extending or retracting another piston of the set works 18 will not occur until the limit switch 114 provides a signal to the control box 20, indicating that the piston 92 has been extended to the desired position and is securely in place.

As the remaining piston and cylinder mounting plates of the set works 18 are held in rigid position relative to one another by the remaining retracted pistons in the initial retracted configuration of the set works 18, the movement of the first piston mounting plate 94 down the guide rods 82, 84 causes a corresponding movement of the carrier positioning module 86. The remaining pistons, cylinders, and mounting plates of the set works 18 move as one rigid unit to slide the positioning module 86 down the guide rods 82, 84. Through the carrier attachment member 66, the carrier positioning module 86 moves the carrier 12 along the travel rails 28.

The retraction of the first piston 92 in the first cylinder 90 is accomplished by exhausting the high pressure air supply previously routed to the first cylinder 90. This allows the secondary air supply routed to the first cylinder 90 to have sufficient force so as to retract the first piston 92 back inside the first cylinder 90. The retraction of the first piston 92 thereby causes the movement of the first piston mounting plate 94 back towards the guide rod end station 78. As in the case of the above movement of the mounting plate 94 towards the carrier positioning module 86, the remaining retracted pistons hold the remaining piston and cylinder mounting plates in rigid position relative to one another and the movement of the mounting plate 94 back down the rods 82,84 causes a corresponding movement of the positioning module 86 back down the rods 82,84. In this way, the first piston mounting plate 94 causes a corresponding movement of the carrier positioning module 86 back towards the guide rod end station 78 along the guide rods 82, 84. The carrier 12, being attached to the set works 18, is moved back along the travel rails 28 as well.

The extension of the second piston 100 from within the second cylinder 98 is initiated by the routing of the high pressure air supply to the second cylinder 98 by the electronic control box 20. The extension of the second piston 100 causes the movement of the first cylinder mounting plate 96 along the guide rods 82, 84. As the first piston mounting plate 94 is held rigid in position relative to the end station 78 by the extended or retracted first piston 92, the extension of the second piston 100 from the second cylinder 98 causes the movement of the first cylinder mounting plate 96 away from the first piston mounting plate 94, and therefore the guide rod end station 78, and towards the carrier positioning module 86. As the remaining pistons, cylinders, and mounting plates of the set works 18 move as one rigid unit, the movement of the first cylinder mounting plate 96 causes the corresponding movement of the carrier positioning module 86 down the guide rods 82, 84. This causes the carrier 12 to be moved down the travel rails 28 a corresponding distance.

As the first cylinder mounting plate 96 is moved away from the guide rod end station 78, the section of the first position set control rod 102 that overlies the second cylinder 98 moves through an opening in the first cylinder mounting plate 96. As the section of the first position set control rod 102 moves through the first cylinder mounting plate 96, a second position set control apparatus 116 is moved towards the first cylinder mounting plate 96 The second position set control apparatus 116 contacts the second limit switch 118 when the second position set control apparatus 116 is brought against the first cylinder mounting plate 96. When the second position set control apparatus 116 contacts the first cylinder mounting plate, the second position set control apparatus 116 serves as a mechanical stop for the extension of the second piston 100. In this manner, the extension of the second piston 100, is limited to a predetermined length and full extension of the piston 100 is indicated by a signal provided by the limit switch 118.

The retraction of a second piston 100 within the second cylinder 98 is accomplished by the exhausting of the high pressure air supply from the second cylinder 98, thereby allowing the secondary air supply connected to the second cylinder 98 to provide a sufficient force so as to retract the second piston 100 within the second cylinder 98. The retraction of the second piston 100 causes the movement of the first cylinder mounting plate 96 back towards the guide rod end station 78. As before, movement of the mounting plate 96 is translated into movement of the end station 78 by the remaining piston, cylinders, and mounting plates of the set works 18 moving as a rigid unit to slide the module 86 on the rods 82, 84. This causes the corresponding movement of the carrier positioning module 86, and, therefore, the carrier 12, back towards the guide rod end station 78.

The remaining cylinders of the set works 18 operate in a similar manner to the operation of the first and second cylinders 90, 98 described above. The remaining cylinders of the set works 18 are arranged in pairs, that is, the third cylinder 122 paired with the fourth cylinder 130 and the fifth cylinder 146 paired with the sixth cylinder 158. As shown in FIGS. 3, the extending piston rods of the paired cylinders are in an opposed relationship to one another and are connected at their common piston mounting plates. The movement of the second piston mounting plate 126 away from the second cylinder mounting plate 120 is controlled by the extension of the third piston 124. The movement of the third cylinder mounting plate 128 away from the second piston mounting plate 126 is controlled by the extension of the fourth piston 132. The movement of the third piston mounting plate 150 away from the fourth cylinder mounting plate 144 is controlled by the extension of the fifth piston 148. Finally, the movement of the carrier positioning module 86 away from the third piston mounting plate 150 is controlled by the extension of the sixth piston 160. The second position set control rod 134 has attached to it the third and fourth position set control apparatus 136, 140 which control the extension of the third and fourth pistons 124, 132. The third position set control rod 152 contains the fifth position set control apparatus 154 and sixth position set control apparatus (not shown) and controls the extension of the fifth and sixth pistons 148, 160.

As previously described, the movement of a mounting plate along the guide rods 82, 84 results in the movement of the positioning module 86 along the guide rods 82, 84 due to the nature of the rigid positioning of the remaining pistons, cylinders, and mounting plates of the set works 18. For example, when second piston mounting plate 126 is moved away from second cylinder mounting plate 120 by the extension of third piston 124, the remaining pistons 132, 148, 160; cylinders 130, 146, 158; and mounting plates 128, 144, 150 act as a rigid unit to slide the carrier positioning module 86 down the guide rods 82, 84. In a similar manner, pistons 92, 100; cylinders 90, 98; and mounting plates 120, 96, 94 form a rigid unit to allow mounting plate 126 to be moved away from end station 78.

The above description of the operation of the set works 18 may be more easily understood with reference to the schematic diagram of FIG. 5. The guide rod end station 78 is fixed to the travel rail mounting member 40 of the frame 16 and, therefore, serves as a point of reference for the movement of the carrier positioning module 86. The carrier positioning module 86, as previously described, is attached to, and dictates the movement of, the carrier 12. In View A of FIG. 5, the pistons of the set works 18 are shown in their fully retracted positions and the carrier positioning module 86 is seen at its first position A. View B of FIG. 5 shows the extension of the first piston 92 causing the movement of the first piston mounting plate 94 towards the carrier positioning module 86. As previously described, the movement of the first piston mounting plate 94 causes a corresponding movement of the carrier positioning module 86, and, therefore, the movement of the carrier 12, to a second Position B. View C of FIG. 5 shows the extension of the second piston 100 which causes the movement of the first cylinder mounting plate 96 away from the first piston mounting plate 94, thereby causing the carrier positioning module 86 to move to its third Position C. View D shows the extension of the third piston 124, thereby moving the second piston mounting plate 126 away from the second cylinder mounting plate 120, thereby moving the carrier positioning module 86 to its Position D. View E of FIG. 5 shows the extension of the fourth piston 132 which moves the third cylinder mounting plate 128 away from the second piston mounting plate 126, thereby moving the carrier positioning module 86 to Position E. View F of FIG. 5 shows the extension of the fifth piston 148, thereby moving the third piston mounting plate 150 away from the fourth cylinder mounting plate 144, thereby moving the carrier positioning module 86 to its Position F. View G of FIG. 5 shows the extension of the sixth piston 160, which moves the carrier positioning module 86 away from the third piston mounting plate 150 to its final Position G.

Figure 5A:
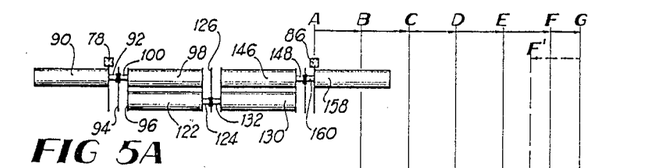
FIGS. 5A–5H are a schematic representation of the linear positioning system set works operation.
Figure 5B:
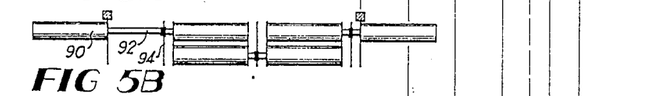
Figure 5C:
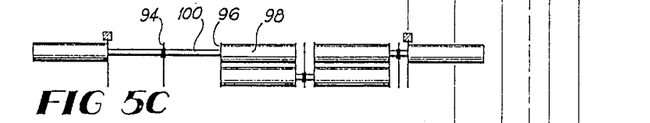
Figure 5D:
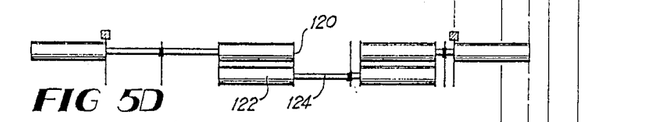
Figure 5E:
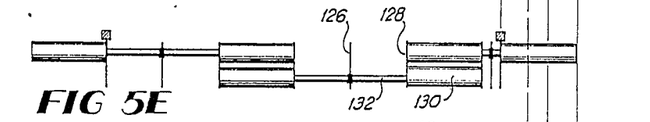
Figure 5F:
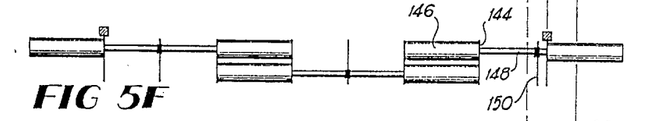
Figure 5G:
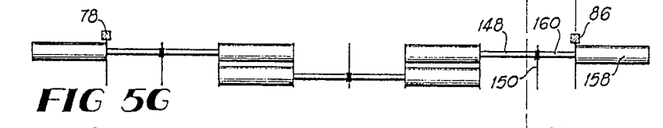
Figure 5H:
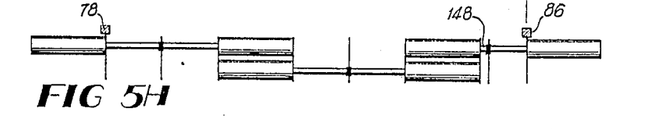

In the above manner, the carrier 12, through the carrier positioning module 86, is moved along the travel rails 28 in discrete steps. This allows for the positioning of the woodworking material held by the carrier 12 in discrete movements. As can be seen in FIG. 5, the retraction of any one of the cylinders of the fully extended set works 18 would result in the movement of the carrier positioning module 86 back towards the guide rod end station 78. The positions A, B, C, D, E, F and G of each stop may be set individually by adjusting the location of the set control apparatus on the position set control rods. In such a manner, continuous locations of discrete position stops for the carrier positioning module 86, and therefore, the carrier 12, are possible. For example, View G of FIG. 5 shows the extension of the sixth piston 160 to be less than the extension of the remaining pistons of the set works 18. If any one of the remaining pistons of the set works 18 is then retracted from its full extension configuration, the carrier positioning module 86 will assume a new position. As can be seen in View H of FIG. 5, when piston 92 is retracted, the carrier module 86 is moved to Position F' which lies in between Positions E and F. Thus, a new discrete position has been realized for the carrier positioning module 86, and carrier 12, without mechanically resetting any of the elements of any of the set control apparatus. As more of the pistons are retracted from their full extension configuration, a whole new set of discrete positions for the carrier positioning module 86 is thus obtained.

In the above manner, the precision linear positioning system 10 of the present invention provides for a large number of discrete positioning steps for positioning a woodworking material about a machining apparatus 14. As a wide variety of positioning configurations are possible, the extension and retraction of the pistons of the set works 18, as well as the operation of the machining apparatus at each stop, is well adapted to control by an electronic programmable cylinder controller. In addition, the setting of the set control apparatus on the position set control rods is easily accomplished in the positioning system 10 by the use of precut gauges for obtaining the correct positioning of the set control apparatus on the position set control rods.

In the typical operation of the precision linear positioning system 10 of the present invention, woodworking material is first placed on the material platform 54 of the carrier 12. One end of the woodworking material is placed against the material clamp fixed element 68 and the other end of the woodworking material is acted upon by the material clamp movable element 70 to position the material against the fixed element 68. The programmable controller of the electronic control box 20 is programmed for the appropriate sequencing of extension and retraction of the pistons of the set works 18. The movement of the machining device 164 along the machining apparatus 14 is also programmed into the programmable controller, as is the activation of the machining device 164 itself. The operator then typically sets the position set control apparatus of the set works 18 in their proper locations on the position set control rods, so as to limit the extension of the pistons of the set works 18 to their proper length. The operator then activates the electronic control box 20 to begin the automatic machining of the woodworking material via the control of the programmable controller. No further operator intervention should be necessary once the programmable controller takes over the operation of the linear positioning system 10, which provides for the precise and repeatable positioning of the woodworking material about the machining apparatus 14.

Although the precision linear positioning system 10 of the present invention is shown as an automatic machining system for woodworking materials, other materials may be affixed to the carrier 12 and acted upon by a machining apparatus 14. The precision linear positioning system 10 is, therefore, adaptable to a wide variety of manufacturing environments and, due to its unique configuration, provides a relatively low cost system for precision programmable machining of a large piece of raw material.

The positioning system 10 may contain multiple machining apparatus 14, which may programmably controlled to perform different machining operations simultaneously on different workpieces mounted on the material carrier 12. This kind of operation assures that the work points are the same for each different machining activity on products which require multiple progressive machining operations. The precision of repeatability and the use of the same fixed clamp element 68 as the zero index point provides axial sameness for the workpoints at each step. Potential savings for plant and equipment, labor, and scrap reduction due to reduced set-up variance between machining centers could be substantial.

A progressive machining sequence executing on the same piece of material at each work position is another alternative utilization of the present invention which may be preferable in some cases. An obvious example where this mode could be useful would be a cylindrical workpiece requiring multiple machining steps and exhibiting physical characteristics which indicate difficulty in repeatability of radial positioning when moved.

What is claimed is:

1. An apparatus for precision linear positioning of material along a frame, comprising:
   (a) carrier means for carrying said material juxtaposed above said frame;
   (b) means for linearly moving said carrier means along said frame comprising a plurality of pneumatic cylinders each having an extendable and retractable piston, said cylinders connected to each other in a series and including a first end pneumatic cylinder attached to said frame and a last end pneumatic cylinder attached to said carrier means, such that said carrier means is moved to a fixed position determined by the amount of the cumulative extension and retraction of said pistons;
   (c) stopping means associated with each said pneumatic cylinder for limiting the extension of each said piston; and
   (d) means for providing a controllable amount of air to each said pneumatic cylinder to selectively control extension and retraction of each said piston.

2. The apparatus of claim 1, wherein said air providing means further comprises a switch associated with each cylinder for providing a signal to said control means when each said piston is extended to the length limited by said stopping means.

3. The apparatus of claim 1, wherein said stopping means associated with each said pneumatic cylinder is adjustable to allow selective linear movement of said carrier means so that the material may be moved sequentially to precise predetermined positions.

4. The apparatus of claim 1, wherein said moving means further comprise at least one guide rod attached to said frame, wherein said carrier means slidably engage said guide rod so that the extension and retraction of said pistons cause the linear movement of said carrier means along said guide rod.

5. The apparatus of claim 2, wherein said air providing means comprise an electronic controller for controlling the sequence of extension and retraction of said cylinders, said electronic controller receiving signals from each said switch such that said electronic controller will not initiate the next step in a control sequence until a pneumatic cylinder currently being extended has been extended to the length limited by said stopping means.

6. The apparatus of claim 1, which further includes machine means attached to said frame for carrying out machining work on said material located on said carrier means, and wherein said air providing means also controls the operations of said machine means so that said machine means operate on said material while said carrier is in a fixed position determined by said stopping means.

7. The apparatus of claim 1, wherein said pneumatic cylinders are double-acting.

8. The apparatus of claim 7, wherein said air providing means comprises a compressed air supply having a high pressure output and a reduced pressure output to each said pneumatic cylinder, said high pressure and reduced pressure outputs providing a cushioning effect for the movement of a piston within each said pneumatic cylinder.

9. A system for precision linear positioning of material along a frame, comprising:
   (a) a carrier means for carrying said material juxtaposed above said frame;
   (b) means for linearly moving said carrier means along said guide rod means comprising:
      (i) guide rod means attached to said frame along which said carrier means is supported and linearly movable;
      (ii) a carrier positioning module securely attached to said carrier means, said carrier positioning module capable of sliding along said guide rods to cause linear movement of said carrier means with respect to said frame, said carrier positioning module supporting said carrier means along said guide rod means;
      (iii) at least two pneumatic cylinders each having an extendable and retractable piston, including a first pneumatic cylinder fixed in position relative to said guide rod means and a last pneumatic cylinder fixed in position relative to said carrier positioning module, said cylinders connected to each other in a series, the extension and retraction of any of said pistons cumulatively causing the sliding of said carrier positioning module along said guide rod means;
      (iv) a piston mounting plate attached to at least one said piston;
      (v) a cylinder mounting plate attached to at least one said cylinder;
   (c) stopping means for limiting the extension of each said piston, comprising:
      (i) a position set control rod attached to said piston mounting plate;
      (ii) a set control apparatus adjustably attached to a position set control rod, said set control apparatus capable of contacting an associated cylinder mounting plate when an associated cylinder has its piston extended, said set control apparatus limiting the further extension of the piston of said associated cylinder upon contacting said associated cylinder mounting plate; and
   (d) means for providing a controllable amount of air to each pneumatic cylinder to selectively control the extension and retraction of each said piston.

10. The system of claim 9, wherein said air providing means further comprise a switch attached to said cylinder mounting plate for providing an electrical signal when said set control apparatus contacts said cylinder mounting plate.

11. The system of claim 10, wherein said air providing means comprise an electronic controller, said electronic controller receiving signals from each said switch.

12. The system of claim 11, wherein said electronic controller is capable of controlling the sequence of extension and retraction of said cylinders, said electronic controller receiving signals from each said switch such that said electronic controller will not initiate the next step in a control sequence until a pneumatic cylinder currently being extended has been extended to the length limited by said set control apparatus.

13. The system of claim 9, wherein said piston mounting plate is attached to two adjacent pistons of two adjacent cylinders connected to each other in a series.

14. The system of claim 9, wherein said set control apparatus is adjustable in position on said position set control and to allow selective linear movement of said carrier means so that the material may be moved sequentially to precise predetermined positions.

15. The system of claim 9, which further includes machine means attached to said frame for carrying out machining work on said material located on said carrier means, and wherein said air providing means also controls the operations of said machine means so that said machine means operate on said material while said carrier is in a fixed position determined by said set control apparatus.

16. The apparatus of claim 9, wherein said pneumatic cylinders are double-acting.

17. The apparatus of claim 16, wherein said air providing means comprises a compressed air supply having a high pressure output and a reduced pressure output to each said pneumatic cylinder, said high pressure and reduced pressure outputs providing a cushioning effect for the movement of a piston within each said pneumatic cylinder.

18. An apparatus for precision linear positioning of a material, comprising:
 (a) a frame;
 (b) carrier means capable of linearly moving along said frame for carrying said material;
 (c) means for linearly moving said carrier means along said frame comprising a plurality of pneumatic cylinders each having an extendable and retractable piston, said cylinders connected to each other in a series and including a first end pneumatic cylinder attached to said frame and a last end pneumatic cylinder attached to said carrier means, such that said carrier means is moved to a fixed position determined by the amount of the cumulative extension and retraction of said pistons;
 (d) stopping means associated with each said pneumatic cylinder for limiting the extension of each said piston; and
 (e) means for providing a controllable amount of air to each said pneumatic cylinder to selectively control extension and retraction of each said piston.

19. The apparatus of claim 18, wherein said frame has a structurally rigid central mainframe portion and a lightweight portion extending out from said mainframe portion.

20. The apparatus of claim 19, which further includes machine means attached to said frame for carrying out machining work on said material located on said carrier means, said machine means attached to said frame at the rigid central mainframe portion.

* * * * *